No. 896,799. PATENTED AUG. 25, 1908.
J. H. BYRAM.
STREET CLEANING PUSH CART.
APPLICATION FILED NOV. 30, 1907.
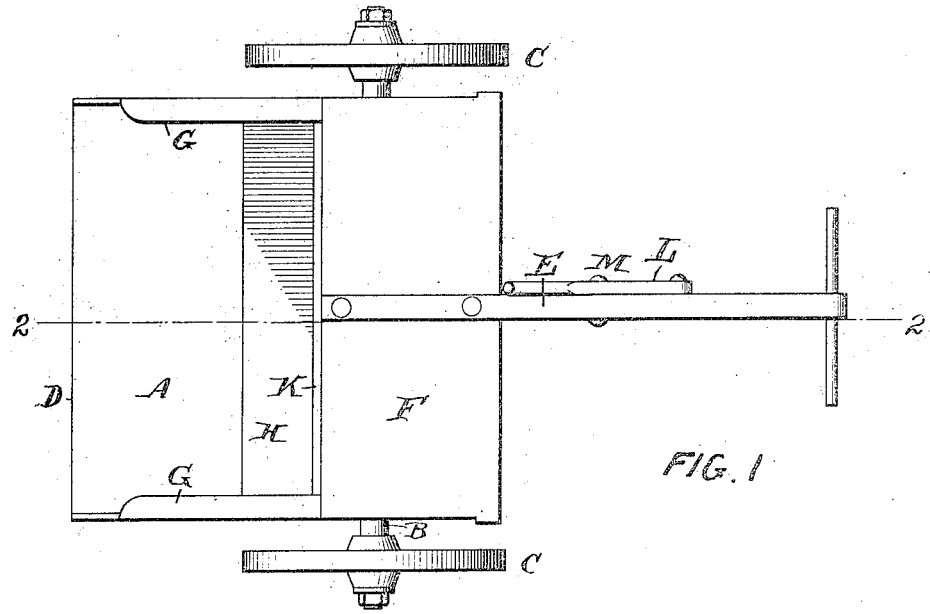
FIG. 1
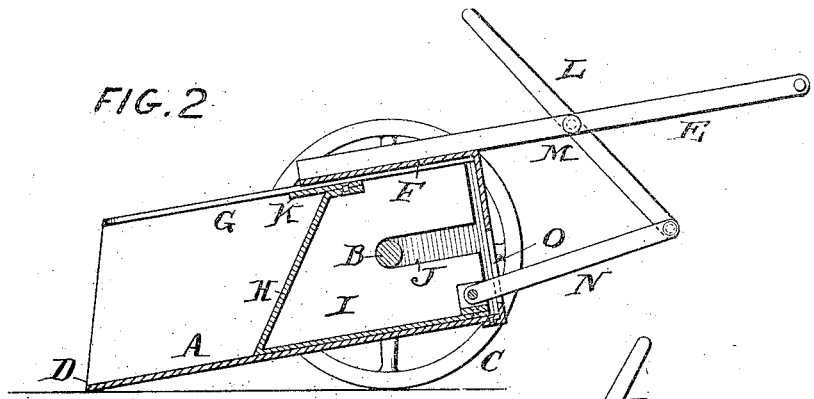
FIG. 2
FIG. 3
Witnesses
Daniel Webster, Jr.
P. M. Kelly
Inventor
Joseph H. Byram
By
Attorney

UNITED STATES PATENT OFFICE.

JOSEPH H. BYRAM, OF PHILADELPHIA, PENNSYLVANIA.

STREET-CLEANING PUSH-CART

No. 896,799.  Specification of Letters Patent.  Patented Aug. 25, 1908.

Application filed November 30, 1907. Serial No. 404,586.

*To all whom it may concern:*

Be it known that I, JOSEPH H. BYRAM, of the city and county of Philadelphia and State of Pennsylvania, have invented an Improvement in Street-Cleaning Push-Carts, of which the following is a specification.

My invention has reference to street cleaning push-carts, and consists of certain improvements which are fully set forth in the following specification and shown in the accompanying drawings, which form a part thereof.

The object of my invention is to provide a construction of street cleaning cart that the street cleaner may quickly scoop up the refuse or sweep it into the cart and as quickly dump the contents when full to bring the cart into condition to receive a fresh load.

My invention consists of a body supported upon wheels and having its forward lower edge adapted to rest upon the ground so that it may act as a scoop or readily receive sweepings, combined with a movable discharging part guided upon the body and adapted to be reciprocated to or from the forward edge to discharge the contents when desired; further in providing the body part with a handle to move and guide it, and a movable handle and connections for operating the discharging part from the rear.

My invention also comprehends details of construction which, together with the features above specified, will be better understood by reference to the drawings, in which:—

Figure 1 is a plan view of a street cleaning push-cart embodying my invention; Fig. 2 is a sectional elevation of the same on line 2—2 of Fig. 1, showing the parts in position to receive the refuse; and Fig. 3 is a similar sectional view showing the parts in position after discharging the contents.

A is the body part and is in general shape rectangular and the rear portion is box shaped. The forward bottom edge D is adapted to rest upon the roadway, as shown in Fig. 2. This body is supported near its rear part on an axle B having wheels C by which the rear part of the body is held at considerable distance above the ground.

E is a handle by which the cart may be moved and manipulated. When the cart is operated as a scoop, the front edge D is allowed to rest upon the roadway by gravity and the cart pushed toward the refuse. When transferring a load to place of discharge, the handle E is depressed to lift the edge D clear of the ground and preferably to incline the floor of the body backward to prevent spilling of the contents. To discharge the contents, the part H is moved forward toward the edge D to push the contents out of the body. The discharging part H is preferably formed as a front of a box-like structure I which is guided within the body. The front part H is preferably somewhat inclined to the floor of the body and at the top is provided with a transverse plate K which gives strength and also overhangs to prevent the refuse working up over the top of the part H.

The body A has its sides provided with inturned flanges G under which the plate K of the part H moves and by which it is held down. The rear portion of the body A is covered as at F by which the rear portion I of the discharging part H is shielded. This part I is slotted, as at J, to permit the axle B to extend across the cart and not to interfere with the reciprocation of the discharging part H, I.

L is a lever, hinged at M to the handle E of the body A, and the lower part of this lever L is connected to the part I by a link N which works through a slot O in the rear of the body A.

When the parts are in the condition shown in Fig. 2, the refuse is gathered into the body A upon its floor and against the part H. When the contents are to be discharged, the lever L is pulled and thereby the discharging part H I is moved forward into the position shown in Fig. 3. It is evident that the forward part of the body may be held at any elevation desired when the discharge takes place.

In practice I prefer to make the cart of sheet metal but do not confine myself to the material of which it is composed. While I have also shown the manner in which I prefer to operate the discharging parts, it is to be understood that I do not restrict myself to the parts as shown as other mechanical means for moving the discharging parts might be employed.

While in general, I have shown my invention in the form which is adapted for commercial use, I do not confine myself to the details thereof as these may be modified without departing from the spirit of the invention.

Having now described my invention, what

I claim as new and desire to secure by Letters Patent, is:—

1. In a street cleaning cart, the combination of a body supported on wheels and having its forward bottom edge adapted to be rested upon the roadway, with a discharging part within the body and movable to and from the forward bottom edge thereof.

2. In a street cleaning cart, the combination of a body supported on wheels and having its forward bottom edge adapted to be rested upon the roadway, with a discharging part within the body and movable to and from the forward bottom edge thereof, a handle to move and tilt the body, a discharging lever hinged to the handle, and a connection between the discharging lever and discharging part.

3. In a street cleaning cart, the combination of a body supported on wheels and having its forward bottom edge adapted to be rested upon the roadway, with a discharging part within the body and movable to and from the forward bottom edge thereof, said discharging part having a forward inclined plate and a rear box-like portion of approximately the cross section of the body.

4. In a street cleaning cart, the combination of a body supported on wheels and having its forward bottom edge adapted to be rested upon the roadway, with a discharging part within the body and movable to and from the forward bottom edge thereof having an inclined forward plate H and an overhanging top plate K, and mechanical devices for reciprocating the discharging part.

5. In a street cleaning cart, a box shaped body open at the front and having a forward bottom edge adapted to rest upon the roadway, combined with two supporting wheels for the body connected therewith to the rear of its center of gravity, a handle extending rearward for guiding and manipulating the body while supported upon its wheels, a discharging device arranged within the body and movable to and from its forward lower edge, and means at the rear of the body for reciprocating the discharging device.

6. In a street cleaning cart, a body having a flat forward lower edge and upright sides, combined with two wheels upon which the body is supported and upon which it may be oscillated in a vertical plane, a handle to operate the body, a discharging device guided within the body and having a discharging face approximated equal to the width and height of the body, and hand operated means for reciprocating the discharging device to or from the front lower edge.

In testimony of which invention, I have hereunto set my hand.

JOSEPH H. BYRAM.

Witnesses:
M. F. DRISCOLL,
R. M. KELLY.